United States Patent [19]

Suzuki et al.

[11] 4,453,247
[45] Jun. 5, 1984

[54] SPEECH PACKET SWITCHING METHOD AND DEVICE

[75] Inventors: Michio Suzuki, Sagamihara; Matsuaki Terada, Machida; Takao Kato; Ryuichi Toki, both of Yokohama, all of Japan

[73] Assignee: Hitachi, Ltd., Tokyo, Japan

[21] Appl. No.: 354,182

[22] Filed: Mar. 3, 1982

[30] Foreign Application Priority Data

Mar. 27, 1981 [JP] Japan .................................. 56-43914

[51] Int. Cl.³ .............................................. H04J 6/00
[52] U.S. Cl. ........................................ 370/94; 370/60
[58] Field of Search .................................... 370/94, 60

[56] References Cited

U.S. PATENT DOCUMENTS 4,317,195 2/1982 Barberis et al. ........................ 370/94
4,320,500 3/1982 Barberis et al. ........................ 370/94

FOREIGN PATENT DOCUMENTS 16477 10/1980 European Pat. Off. .............. 370/94
57-89356 6/1982 Japan .................................... 370/94

*Primary Examiner*—Douglas W. Olms
*Attorney, Agent, or Firm*—Antonelli, Terry & Wands

[57] ABSTRACT

In a speech packet switching system, an input speech signal to a speech packet transmitting station is converted to a digital signal to form speech data blocks, which are discriminated to talkspurt blocks and silence blocks, and only the talkspurt speech blocks are packetized and transmitted through a speech packet switching network. In a receiving station, a series of speech packets received in one talkspurt period are temporarily stored in a variance absorbing buffer to compensate for a variance of transmission delay times resulting from the transmission through said speech packet switching network to add variance absorbing times to the speech packets depending on the transmission delay times of the respective speech packets. Then the speech packets are sequentially reproduced. A size of the variance absorbing buffer is determined by a variance of the transmission delay times of the speech packets received in one talkspurt period and the size of the variance absorbing buffer for the next talkspurt period is dynamically changed based on the determined size. A constant speech quality is assured to a change of the variance of the transmission delay times of the speech packets due to a change of traffic in the speech packet switching network.

2 Claims, 7 Drawing Figures

SPEECH PACKET SWITCHING METHOD AND DEVICE

BACKGROUND OF THE INVENTION

The present invention relates to speech packet switching method and device for telephone conversation by a packet switching system.

In recent years, a packet switching system in which an analog speed signal is converted to a digital signal by a pulse code modulation (PCM) system and the digital signal is packeted and transmitted via a packet switching network has been proposed and put into practice. In the speech packet switching system, speech and silence are discriminated and only the speech or a talkspurt is packeted as speech packet for transmission in order to reduce a burden to the packet switching network.

On the other hand, in the packet switching network, a transmission time of the packet through the packet switching network, that is, a network transmission delay time differs from packet to packet. This variance depends on a condition of the packet switching network or amount of traffic in the packet switching network. When the traffic in the packet switching network is in a steady state, the variance of the transmission delay time of the packet is constant but as the amount of traffic increases, the variance of the transmission delay time increases and as the amount of traffic decreases, the variance of the transmission delay time decreases.

The variance of the transmission delay time of the packet is an important factor in realizing the speech packet switching system. For example, in a receiving station, if a speech packet to be reproduced next has not yet been received due to the variance when a current speech packet was reproduced, a voice interruption occurs. Accordingly, in the speech packet switching system, a buffer is provided in the receiving station to absorb the variance and the speech packets are temporarily stored therein and appropriate delay times are intentionally added to the speech packets depending on the transmission delay times of the respective speech packets. More specifically, the speech packets having small transmission delay times in the packet switching network are retained in the variance absorbing buffer for a long time period to add long delay times while the speech packets having large transmission delay times in the packet switching network are provided with small additional delay times. In this case, a speech packet having a transmission delay time which is longer than a time period for which a speech packet having zero transmission delay time is retained in the variance absorbing buffer, that is, longer than a maximum additional delay time, is not reproduced but cut away because it is received after the reproduction time. In the speech packet switching system, the failure of arrival of the speech packet at the reproduction time is called a packet loss. As a packet loss factor increases, a speech quality is degraded. Experimentally, the packet loss factor of below 5% is permissible but when it is larger than 10% the degradation of the quality is not permissible.

In the prior art speech packet switching system, the variance absorbing buffer is fixed. Thus, if the transmission delay time of the packet increases due to the variance in time of the traffic in the speech packet switching network, the packet loss factor increases resulting in the degradation of the speech quality.

SUMMARY OF THE INVENTION

It is an object of the present invention to provide a speech packet switching system which assures a constant packet loss factor even if the traffic in the packet switching network increases and reduces a delay time added in the variance absorbing buffer when the traffic decreases.

In order to achieve the above object, in accordance with the present invention, a variance of the transmission delay times of the speech packets in one talkspurt is determined to determine a capacity of the variance absorbing buffer for accommodating the variance, and the capacity of the variance absorbing buffer for the next talkspurt is dynamically updated in accordance with the determined capacity.

DESCRIPTION OF THE PREFERRED EMBODIMENTS

Figure 1:
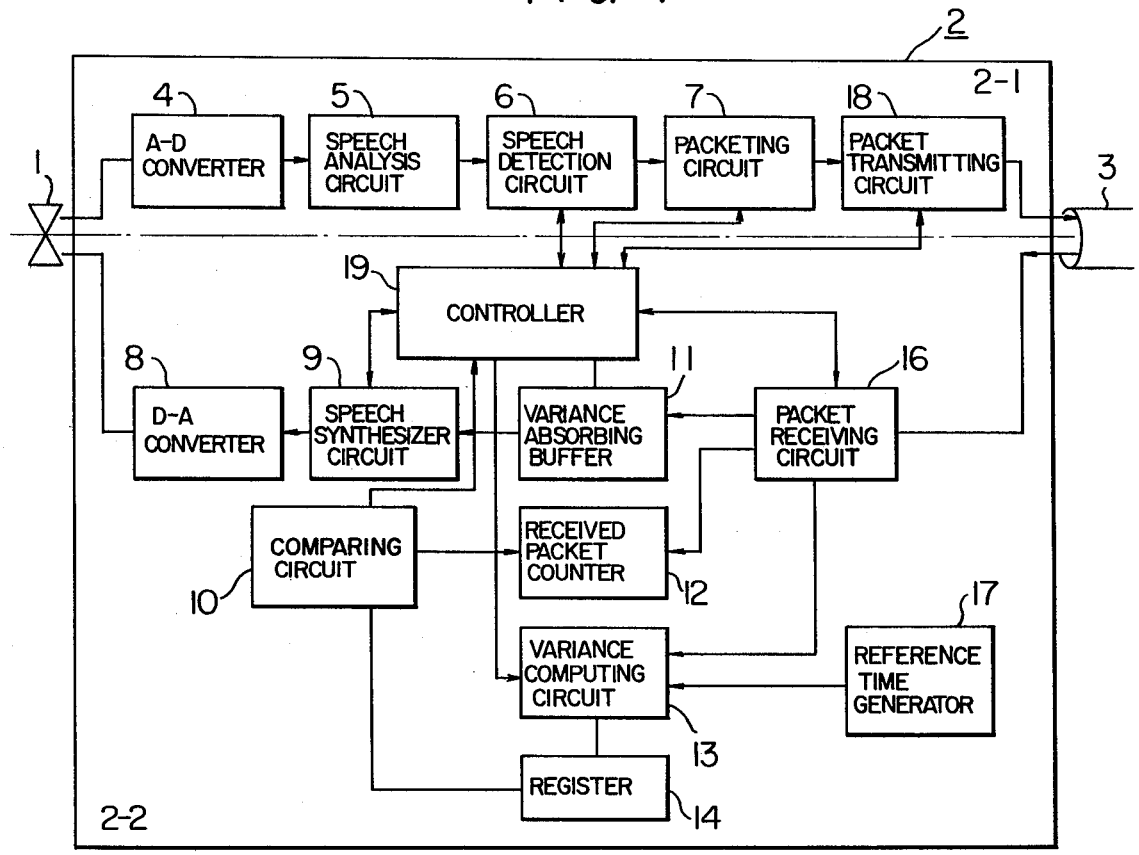
FIG. 1 shows a configuration of a speech packet switching system in accordance with the present invention.

FIG. 1 shows a conceptual block diagram of one embodiment of a speech packet switching system of the present invention. In FIG. 1, numeral 1 denotes a telephone set, numeral 2 denotes a speech packet terminal and numeral 3 dentoes a transmission line which is connected to a packet switching network.

The speech packet terminal 2 is sectioned by a chain line into a packet transmitter 2-1 and a packet receiver 2-2. The packet transmitter 2-1 above the chain line of FIG. 1 is first explained. A speech signal from the telephone set 1 is converted by an A-D converter 4 to a digital signal of, for example, 64 Kbps, which is further converted to a digital signal of, for example, 4.8 Kbps by a speech analysis circuit 5. The output signal from the speech analysis circuit 5 comprises parameters representing a characteristic of a speaker's vocal tract, a voice frequency and a voice amplitude. A speech detection circuit 6 discriminates speech and silence based on the amplitude parameter and informs the result to a controller 19. The controller 19 instructs to a packetizing circuit 7 to form a speech packet only during the talkspurt. In response to the instruction, the packetizing circuit 7 forms the speech packet and sends it to a packet transmitting circuit 18, which transmits it to a packet switching network through a packet transmission line 3.

The present invention is charracterized by the packet receiver 2-2 below the chain line of FIG. 1.

Figure 2:
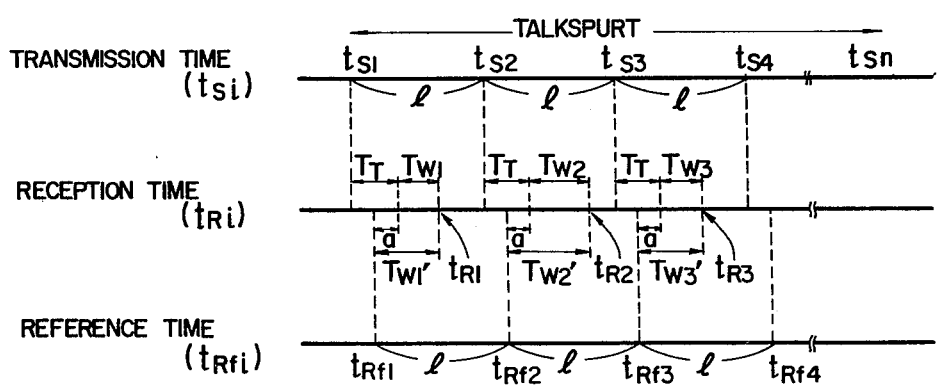
FIG. 2 shows a model diagram for illustrating a time relation between transmission and reception of a speech packet in accordance with the present invention.

FIG. 2 shows a model diagram for illustrating time relation between transmission and reception of the speech packet in accordance with the present invention.

Figure 3:
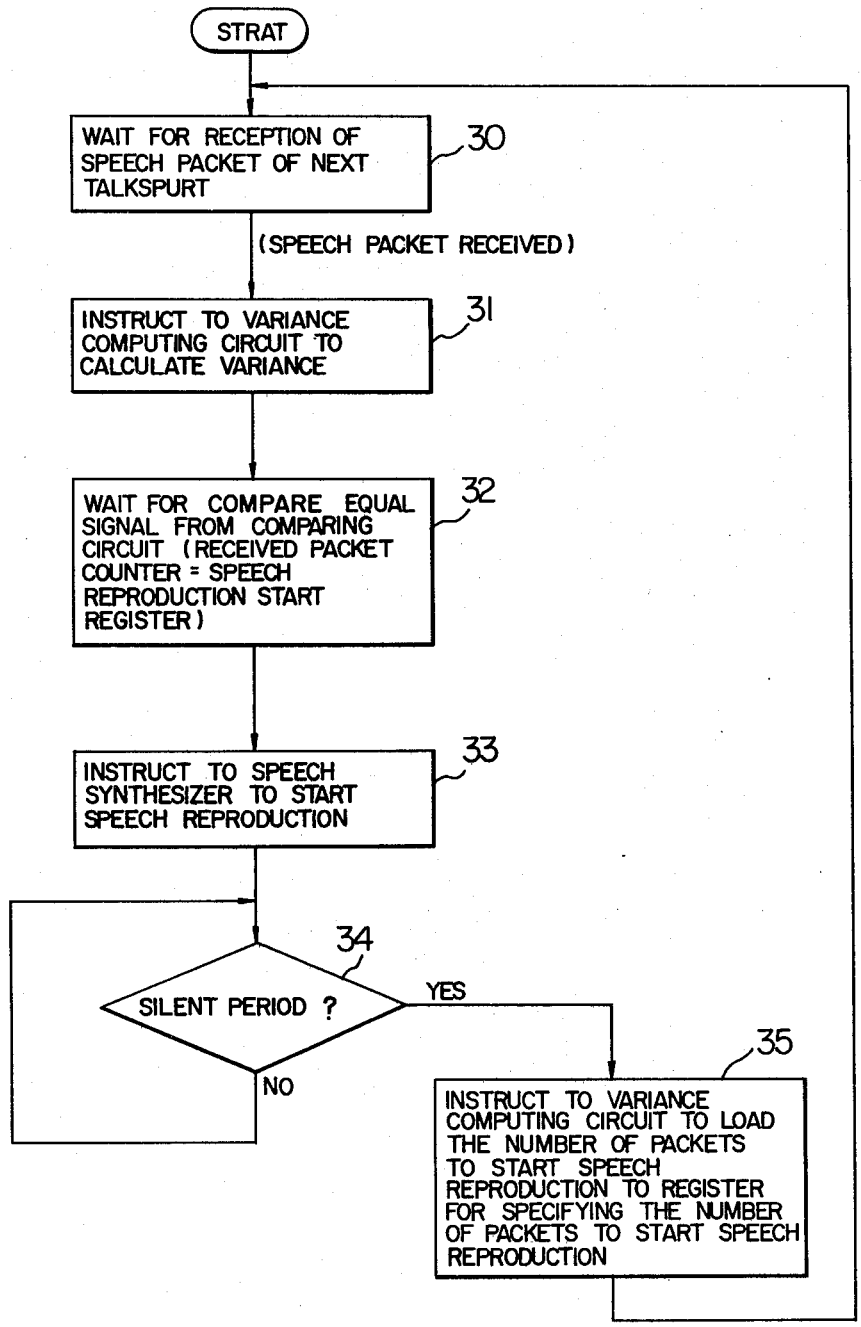
FIG. 3 shows a flow chart for illustrating an operation of a controller shown in FIG. 1.

FIG. 3 shows a flow chart for illustrating an operation of the controller 19 when the speech packet is received.

Figure 4:
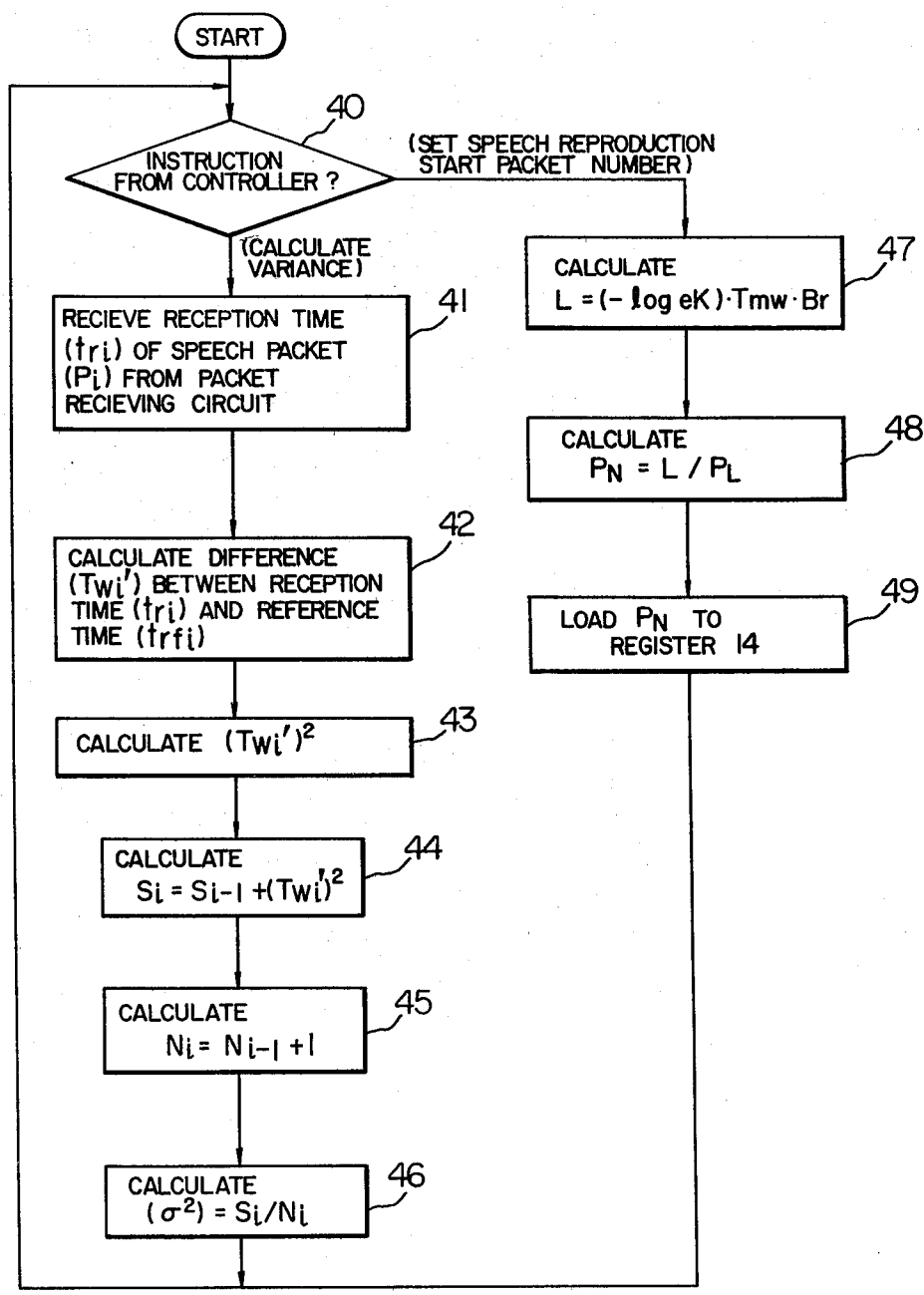
FIGS. 4 and 5 show flow charts for illustrating operations of a variance computing circuit shown in FIG. 1.

FIG. 4 shows a flow chart for illustrating an operation of a variance computing circuit 13.

Referring now to FIGS. 2 to 4, the operation of the packet receiver 2 is explained in detail.

The speech packet from the packet switching network is received by a packet receiving circuit 16 through the transmission line 3 and it is then sent to a variance absorbing buffer 11. The packet receiving circuit 16 also communicates to a received packet counter 12 and a variance computing circuit 13 which is a feature of the present invention (step 31 in FIG. 3). The received packet counter 12 counts the number of speech packets in one talkspurt and it is cleared at the end of the talkspurt.

The function of the variance computing circuit 13 which is the feature of the present invention is described. Experimentally, an average time period of the talkspurt is approximately 1–4 seconds and a time period of silence is approximately 1–8 seconds. Accordingly, assuming that a time period of speech signal in one speech packet is 30 milliseconds, several tens speech packets are included in one talkspurt. The function of the variance computing circuit 13 is to determine a variance of transmission delay times of the speech packets included in the talkspurt.

The variance is determined in the following way. It is based on the following two natures.

(1) The transmission delay times in the packet switching network can be approximated by an exponential distribution.

(2) A time interval between the speech packets in the transmitting station is constant within a given talkspurt.

Referring to FIG. 2, $t_{si}$ and $t_{ri}$ (i=1, 2, ... n, n being the number of speech packets in one talkspurt) represent transmission time points and reception time points, respectively, of the speech packets in one talkspurt, $T_T$ represents a propagation time and $T_{wi}$ represents a transmission wait time for which the speech packet switching station waits for the transmission of another speech packet. The propagation time $T_T$ is constant and the transmission delay time which is approximated by the exponential distribution described in (1) above corresponds to $T_{wi}$. Thus, the following relation is met.

$$T_{ri} = t_{si} + T_r + T_{wi} \qquad (1)$$

Accordingly, if $t_{si}$ is determined in the receiving station, $T_{wi}$ can be determined from the equation (1) and the variance of the transmission delay times can be calculated based on $T_{wi}$. In actual, however, it is not possible to determine $t_{si}$ in the receiving station. Accordingly, reference time points $t_{rfi}$ having a time interval equal to that of $t_{ri}$ are considered in the receiving station. Time periods a and $T_{wi}'$ are also defined as shown in FIG. 2. Thus, $T_{wi}'$ can be determined from $$T_{wi}' = t_{ri} - t_{rfi} \qquad (2)$$

In response to a variance calculation instruction from the controller 19 (step 40 in FIG. 4), the variance computing circuit 13 receives the reception time $t_{ri}$ of the speech packet $P_i$ from the packet receiving circuit 16 (step 41 in FIG. 4) and calculates a difference $T_{wi}'$ between the reception time $t_{ri}$ and the reference time $t_{rfi}$ from a reference time generating circuit 17 based on the equation (2).

The variance $\sigma^2(T_{wi}')$ of the time differences $T_{wi}$ is expressed by $$\sigma^2(T_{wi}) = \frac{1}{N_i} \sum_{i=1}^{N} (T_{wi}')^2 = \frac{S_i}{N_i} \qquad (3)$$

where $N_i$ is the number of received packets.

Thus, $(T_{wi}')^2$ is first calculated (step 43 in FIG. 4), then $S_i$ is calculated (step 44 in FIG. 4) and the number of received packets $N_i$ is determined (step 45 in FIG. 4) and based on the above the variance $\sigma^2(T_{wi}')$ is calculated (step 46 in FIG. 4).

$T_{wi}$ and $T_{wi}'$ have the following relation.

$$T_{wi}' = T_{wi} + a \qquad (4)$$

In general, a statistical variance $\sigma^2(x)$ meets the following relation.

$$\sigma^2(x) = \sigma^2(x+a)$$

where a is a constant. Accordingly, from the equation (4), $$\sigma^2(T_{wi}') = \sigma^2(T_{wi}+a) = \sigma^2(T_{wi}) \qquad (5)$$

Since $T_{wi}'$ is determined from the equation (2), the variance of $T_{wi}$ can be determined from the equation (5).

The variance computing circuit 13 has a function to compute the variance of the transmission times for each talkspurt in accordance with the method described above. The variance computing circuit 13 determines a size of the variance absorbing buffer necessary to accommodate the determined variance. When the variance of the transmission delay times is small, the size of the variance absorbing buffer may be small, and as the variance increases the size of the variance absorbing buffer should be increased. A square root of the variance and the size of the variance absorbing buffer are linearly related. Specifically, the size of the variance absorbing buffer corresponds to the number of speech packets stored in the variance absorbing buffer from the start of the reception of the speech packets in the talkspurt to the start of the reproduction of the speech packets. The variance computing circuit 13 first computes the size L of the variance absorbing buffer in accordance with an equation (6) (step 47 in FIG. 4).

$$L = (-\log_e K) \cdot T_{mw} \cdot Br \qquad (6)$$

where $T_{mw}$ is an average delay time which corresponds to a square root of the determined variance $\sigma^2$, that is $$\sqrt{\frac{S_i}{N_i}},$$

Br is a speech bit rate and K is an allowable packet loss factor.

Based on the size L, the number of speech packets $P_N$ to start the speech reproduction is calculated from an equation (7) (step 48 in FIG. 4).

$$P_N = L/P_L \qquad (7)$$

where $P_L$ is a packet length. The number $P_N$ is loaded to a register 14 which specifies the number of speech packets to start the speech reproduction (step 49 in FIG. 4).

The function of the variance computing circuit 13 which is the feature of the present invention has thus far described.

When the speech packet in the next talkspurt is received, a comparing circuit 10 compares the content of the received packet counter 12 with the content of the register 14 for specifying the number of speech packets to start reproduction, and when compare equal is detected it is informed to the controller 19. In response to the signal from the comparing circuit 10 (step 32 in FIG. 3), the controller 19 instructs to a speech synthesizer circuit 9 to start the reproduction of the speech (step 33 in FIG. 3). The speech synthesizer circuit 9 responds to the instruction from the controller 19 to sequentially reads out the speech packets from the variance absorbing buffer 11 at a constant interval, that is, at an interval of the speech signals included in one speech packet to convert them to digital signals of 64 Kbps. The digital signals are thus supplied to a D-A converter 8, which reproduces an analog signal corresponding to the original speech from the 64 Kbps digital signals. The analog signal is then supplied to the telephone set 1.

The controller 19 monitors the variance absorbing buffer 11 to detect the silence period (step 34 in FIG. 3) and if it is detected the controller 19 instructs to the register 14 for specifying the number of speech packets to start reproduction to load thereto the number of speech packets to start the speech reproduction (step 35 in FIG. 3).

As described hereinabove, according to the present invention, the variance of the transmission delay times of the speech packets is determined in the receiving station and the size of the variance absorbing buffer 11 is dynamically changed based on the determined variance. Thus, even if the variance of the transmission delay times varies due to the change of the traffic in the packet switching network, the quality of speech is kept unchanged.

In the present embodiment, the method of calculating the variance in the variance computing circuit 13 is statistically determined in a strict manner. However, if the strict calculation is not necessary, it may be determined in another way. One exmaple thereof is explained below.

Figure 5:
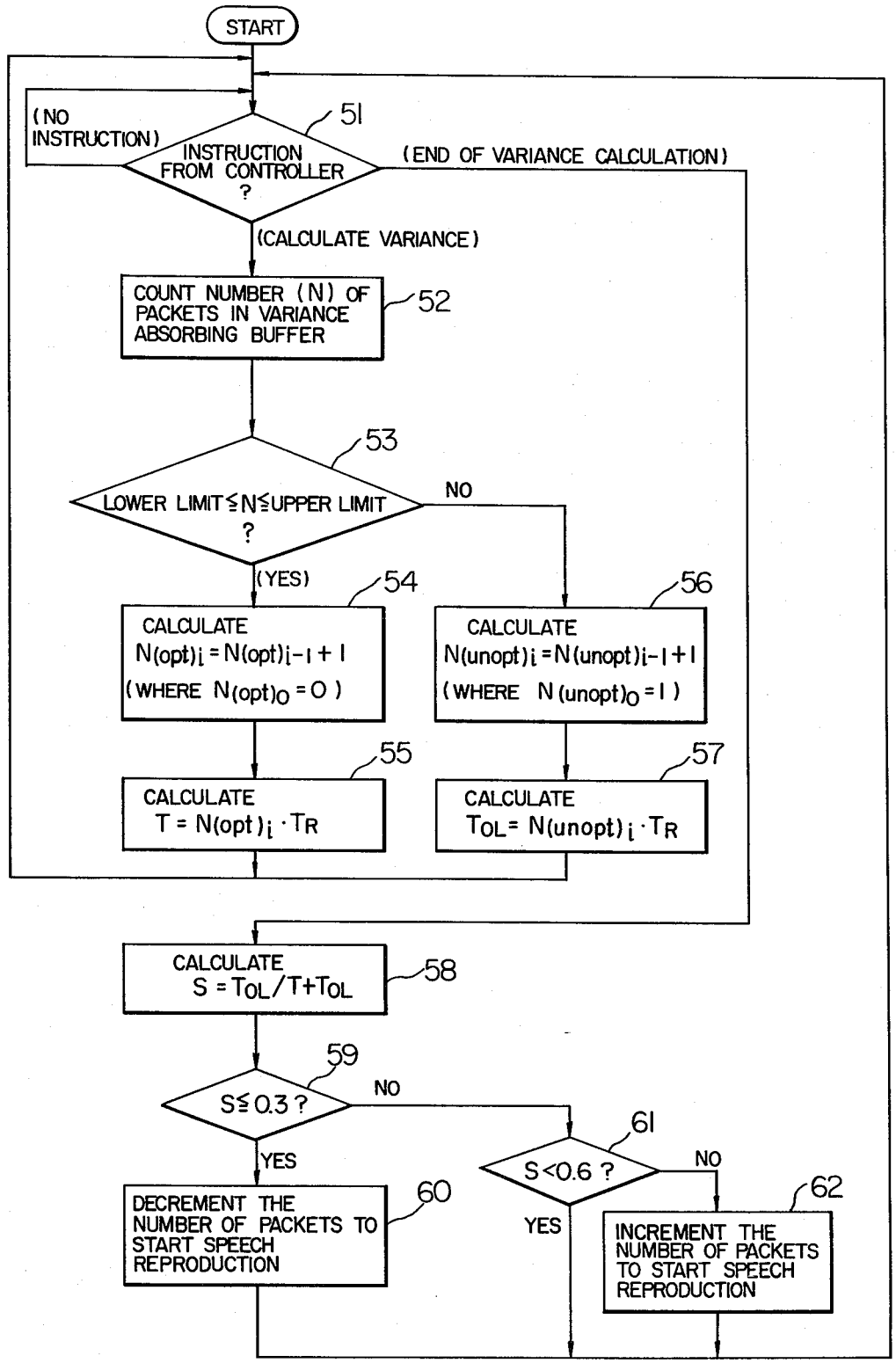

FIG. 5 shows a process flow of the variance computing circuit 13 in accordance with the alternative method.

Figure 6:
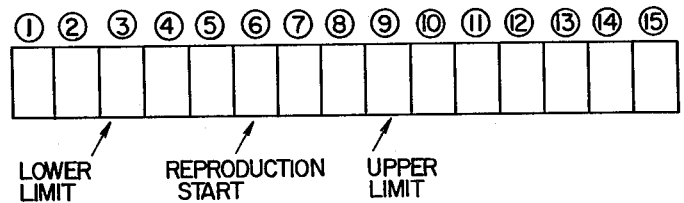
FIG. 6 shows a configuration of a variance absorbing buffer shown in FIG. 1.

FIG. 6 shows a configuration of the variance absorbing buffer 11.

Referring to FIG. 6, the status of the receiving buffer (or variance absorbing buffer 11) during the speech reproduction is now explained. As described above, FIG. 6 shows an example of the variance absorbing buffer 11. It has a size corresponding to 15-speech packet length. The speech packets received are sequentially stored starting from a leftmost position ①. By way of example, let us assume that the speech reproduction starts from a time point when the number of packets received reaches 6. As the speech synthesizer circuit 9 reads out one of the speech packets, fine speech packets remain in the variance absorbing buffer 11. They are shifted left to occupy the positions ①–⑤. If the variance of the transmission delay times of the speech packets is zero, the next speech packet must have reached before the speech synthesizer circuit 9 completes the speech reproduction for the current speech packet. Accordingly, the number of the speech packets in the variance absorbing buffer 11 is either 5 or 6. At the end of the talkspurt, the number of speech packets in the variance absorbing buffer decreases sequentially.

When a variance is included in the transmission delay times, the next speech packet may not have arrived from the packet switching network when the speech synthesizer circuit 9 completed the reproduction of the current speech packet. Since the speech synthesizer circuit 9 further reads out the next speech packet from the variance absorbing buffer 11, the number of speech packets in the variance absorbing buffer 11 decreases to 4. It may decrease to 3 or 4 in some cases. On the other hand, a plurality of speech packets may arrive from the packet switching network before the speech synthesizer circuits 9 completes the reproduction of the current speech packet. In this case, the number of speech packets in the variance absorbing buffer 11 is larger than the number of speech packets at the start of the reproduction. As the variance of the transmission delay times of the speed packets increases, the variance of the number of the speech packets in the variance absorbing buffer 11 increases. From this nature, the size of the variance absorbing buffer can be approximated. As shown in FIG. 6, a lower limit and an upper limit are set at positions corresponding to the number of packets to start speech reproduction ±n, and a time period T in which the number of packets in the variance absorbing buffer 11 during the speech reproduction is between the upper limit and the lower limit, and a sum ($T_{OL}$) of a time period in which the number of packets is smaller than the lower limit and a time period in which the number of packets is larger than the upper limit are measured (steps 50–57 in FIG. 5).

When the controller 19 instructs the variance calculation to the variance computing circuit 13 (step 51 in FIG. 5), the number of packets N in the variance absorbing buffer 11 is counted (step 52 in FIG. 5) to check if the number N is between the lower limit and the upper limit (step 53 in FIG. 5).

The controller 19 instructs the variance calculation to the variance computing circuit 13 each time when the speech synthesizer circuit 9 reads out the speech packet from the variance absorbing buffer 11 and reproduces it. Accordingly, the time interval at which the variance computing circuit 13 checks the number of speech packets in the variance absorbing buffer 11 is equal to the reproduction time of one speech packet.

On the other hand, if the number of packets N is between the lower limit and the upper limit, the number of times $N_{(opt)i}$ of the cases where the number of packets N when the variance computing circuit 13 checks the variance absorbing buffer 11 is between the lower limit and the upper limit is calculated (step 54 in FIG. 5). If the number of packets N is not between the lower limit and the upper limit, the number of times $N_{(unopt)i}$ of the cases where the number of packets N when the variance computing circuit 13 checks the variance absorbing buffer 11 is not between the lower limit and the upper limit is calculated (step 56 in FIG. 5).

The numbers of times $N_{(opt)i}$ and $N_{(unopt)i}$ are multiplied by a reproduction time $T_R$ for one speech packet to a calculate the time period T in which the number of packets N is between the lower limit and the upper limit and the time period $T_{OL}$ in which the number of packets N is not between the lower limit and the upper limit (steps 55 and 57 in FIG. 5). The time $T_{OL}$ is divided by the talkspurt time T+T$_{OL}$ (step 58 in FIG. 5). Depending on the resulting quotient S, the content of the register 14 for specifying the number of packets to start speech reproduction is changed. For example, if S is smaller than 0.3 (step 59 in FIG. 5), the content of the register 14 is decremented (step 60 in FIG. 5), if S is 0.3-0.6, the content of the register 14 is not changed, and if S is 0.6-1.0 (step 61 in FIG. 5), the content of the register 14 is incremented (step 62 in FIG. 5). Those values and the value of n may be experimentally determined.

Figure 7:
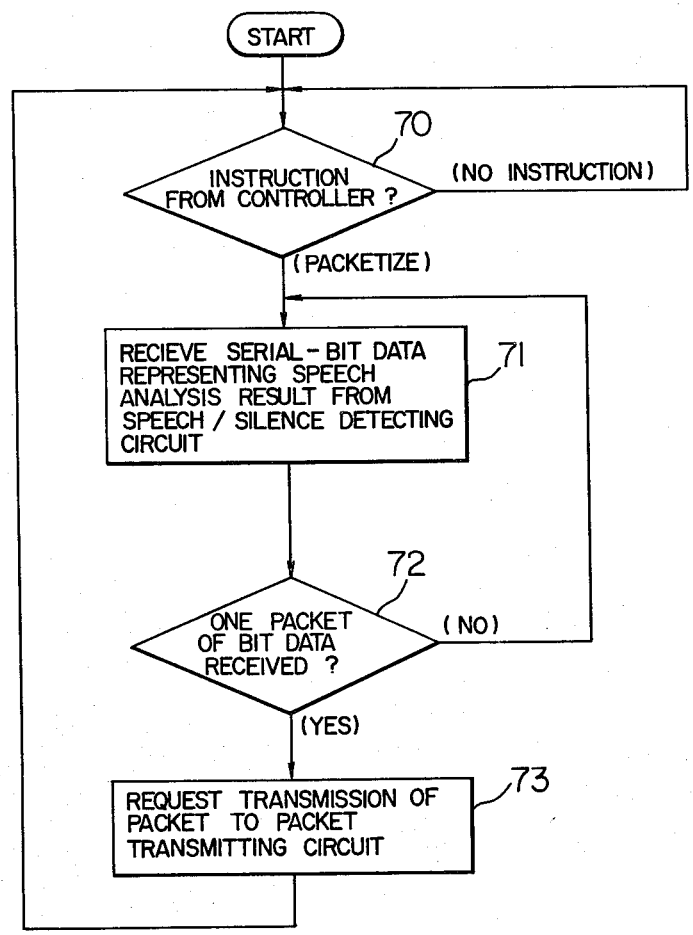
FIG. 7 shows a flow chart for illustrating an operation of a packetizing circuit shown in FIG. 1.

FIG. 7 shows a process flow when the packtizing circuit 7 of FIG. 1 is implemented by a processor. When the controller 19 instructs packetization (step 70 in FIG. 7), the processor receives a serial-bit data of speech analysis from the speech/silence detection circuit 6 (step 71 in FIG. 7). It is checked if one packet of bit data have been received (step 72 in FIG. 7), and if they have been received, the processor requests packet transmission to the packet transmission circuit 8 (step 73 in FIG. 7).

The speech analyzing circuit 5, the speech synthesizer circuit 9 and the speech/silence detection circuit 6 shown in FIG. 1 may be realized by the techniques disclosed in:

(1) Markel, J: Linear Prediction: A Tutorial Review, Proc. IEEE 63-4 (April 1975), (2) Itakura, F and Saito, S: Digital Filtering Technique for Speech Analysis and Synthesis, Proc. 7th ICA, 25C1 (1971), and (3) Bernard Gold: Digital Speech Networks, Proc. IEEE, VOl. 65, No. 12.

The packet transmitting circuit 18 and the packet receiving circuit 16 may be realized from Motorola IC Manual: Advanced Data Link Controller (ADLC) MC6854/MC68A54.

As described hereinabove, according to the present invention, by calculating the variance of the transmission delay times of the speech packets and dynamically changing the size of the variance absorbing buffer for the next speech period based on the determined variance, a constant speech packet loss factor is assured even when the traffic in the packet switching network increases. When the traffic decreases, the delay time to be added in the variance absorbing buffer can be reduced.

We claim:

1. In a speech packet switching system having receiving means for receiving speech packets transmitted via a speech packet switching network, a variance absorbing buffer for temporarily storing therein the speech packets received by said receiving means to compensate for a variance of transmission delay times resulting from the transmission through said speed packet switching network, and reproducing means for reproducing the speech packets serially read out from said variance absorbing buffer, a speech packet switching method comprising the steps of:

determining a variance of transmission delay times of the speech packets in a talkspurt period received by said receiving means;

determining a size of said variance absorbing buffer corresponding to the determined variance; and dynamically changing the size of said variance absorbing buffer for the next talkspurt period based on the determined size.

2. A speech packet switching system comprising:

receiving means for receiving speech packets transmitted via a speech packet switching network;

a variance absorbing buffer for temporarily storing therein the speech packets received by said receiving means;

reproducing means for reproducing the speech packets read out from said variance absorbing buffer;

computing means for calculating a variance of transmission delay times of the speech packets in a talkspurt period received by said receiving means and calculating a size of said variance absorbing buffer corresponding to said variance; and means for dynamically changing the size of said variance absorbing buffer for the next talkspurt period based on the size determined by said computing means.

* * * * *